United States Patent Office 3,266,987
Patented August 16, 1966

3,266,987
SUBSTITUTED THIOUREA COMPOUNDS AND METHODS OF USING SAME AS ANTHELMINTICS
Jennifer Crowley, James Loudon Lowe, and Bryan Harper Palmer, Nottingham, England, assignors to Boots Pure Drug Company Limited, Nottingham, England, a British company
No Drawing. Filed May 27, 1963, Ser. No. 283,567
Claims priority, application Great Britain, June 8, 1962, 22,285/62
11 Claims. (Cl. 167—53)

This invention relates to anthelmintic compositions and to a new compound which has been found to possess anthelmintic properties. In particular the invention relates to compositions which are effective for the removal of tapeworms and other helminths from hosts infested therewith. It further relates to new methods for the treatment of helminthiasis.

According to one aspect of the invention there is provided a method of treating helminthiasis which comprises administering to a host infected with helminthiasis an anthelmintically effective amount of a compound of the general Formula I

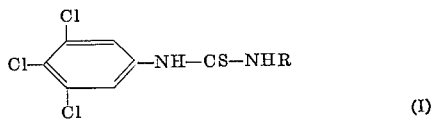

in which R represents 3,4,5-trichlorophenyl, 3,4-dichlorophenyl or 3,5-dichlorophenyl. The compounds are desirably used at a dose of about 15 to 100 mg./kg. of host body weight.

According to another aspect of the invention there are provided anthelmintic compositions in dosage unit form which comprise a compound of the aforementioned general Formula I in association with a non-toxic diluent. By the term "non-toxic diluent" we means one or more diluents, carriers, excipients etc. which are well known in the art and which, when associated with an active ingredient as hereinbefore defined, provide compositions in a suitable form for administration to hosts suffering from helminthiasis. Preferably the compositions are in a form suitable for oral administration.

The compositions of the invention may be in liquid or solid form. Thus for example, they may take the form of tablets, capsules, aqueous suspensions (commonly known in the veterinary art as drenches), injectable preparations, powders or liquids for mixing with food or water, or other forms well-known in the art as suitable for administration to hosts suffering from helminthiasis. Hereinafter there will be described typical compositions which are encompased by the present inveniton.

Tablets may be prepared by admixing the active ingredient with suitable excipients such as binding agents, disintegrating agents and lubricants and tabletting this mixture in a suitable machine. Starch, talc, kaolin, lactose and magnesium stearate are examples of suitable excipients. Capsules may consist of the active ingredient enclosed in a capsule of an innocuous substance such as gelatin. Alternatively the active ingredient may be admixed with a suitable diluent, such as lactose, liquid paraffin or petroleum jelly prior to encapsulation. The compositions of the invention also include enteric coated tablets or capsules which may be prepared by methods well-known in the art, for example by the provision of formaldehyde-hardened gelatin capsules or by the use of cellulose acetate phthalate.

The compositions of the invention also include intimate admixtures of the active ingredient with low melting fats or waxes, such as hydrogenated vegetable oils or paraffin wax. Such admixtures may be formed into spheroidal particles of a convenient size. If desired these particles may be encapsulated or provided with enteric coatings.

The hereinbefore described compositions such as tablets, capsules and spheroidal pellets may also contain suitable antioxidants, exsiccated absorbents and buffers in order to increase the stability of the compositions.

The aqueous suspensions of the invention may comprise for example the active ingredient in association with a dispersing agent and/or a suspending agent and water, together with suitable wetting, flavouring and colouring agents if desired. It may be convenient to supply the user with a wettable powder which the used may add to water to provide an aqueous suspension of active ingredient. Such wettable powders may comprise the active ingredients in association with a dispersing agent and/or suspending agent, and if desired, a wetting agent and suitable colouring and flavouring additives. Other inert diluents may be added in order to assist in the production of a powder in a finely-divided form. As an alternative the user may be supplied with a suspension of active ingredient in a water-immiscible liquid such as liquid paraffin. Such a composition may also contain a wetting agent and suspending agents and/or dispersing agents, and may be added to water prior to use.

The non-toxic diluent may be an animal feeding stuff. The term "animal feeding stuff" as used in this specification is intended to include any material normally ingested by and necessary for the well-being of animals and birds. From the point of view of palatability it may be convenient to treat the active ingredient by suitable means before mixing it with feeding stuff. Thus for example the active ingredient may be coated with an innocuous wax, fat or hydrogenated vegetable oil, for example stearic acid, prior to admixture with the feeding stuffs.

The compositions of the invention also include compositions which comprise the active ingredient coated with a protective colloid, such coating being brought about by making use of the phenomenon known as coacervation. Thus one or more colloids such as gelatin or gum arabic in a sol phase may be induced to separate into two phases, one a colloid-rich phase and the other a colloid-depleted phase. If this phenomenon is induced in the presence of a suspension of solid particles, such as particles of a compound of general Formula I, the colloid-rich phase can be made to form a coating round the individual particles. The mixture may then be gelled, for instance by cooling and there are obtained granules, each consisting of small quantities of solid coated with colloid. Such granules may then be treated in order to stabilise the colloidal coating. Thus in the case of gelatin, the coating may be hardened by treatment with Formalin.

It may be desirable to include in the compositions of the invention intended for oral administration an antiemetic such as for example cyclizine.

Liquid preparations for injection, for example, may comprise sterile aqueous suspensions of the active ingredient or sterile solutions in suitable innocuous solvents such as propylene glycol.

The compositions of the invention may also contain a second anthelmintic if desired, e.g. thiabendazole.

From the point of view of ease and cheapness of manufacture, N,N' - bis(3,4,5 - trichlorophenyl)thiourea offers considerable advantage and we prefer to use this compound for certain treatments, for example the treatment of sheep infested with tapeworm. For this a dosage of 50–100 mg./kg. is satisfactory. However N-3,5-dichlorophenyl-N'-3,4,5-trichlorophenyl thiourea is less toxic, and thus it is preferable to use this compound in some cases, for example for the treatment of dogs infested with tapeworms.

The compound of general Formula I in which R represents 3,5-dichlorophenyl, viz. N-3,5-dichlorophenyl-N'3,4,5-trichlorophenyl thiourea, has not previously been described, and accordingly further features of the invention are the provision of this novel compound and the processes for its preparation by methods known in the art for the preparation of substituted diphenylthioureas. For example 3,4,5-trichlorophenylisothiocyanate may be reacted with 3,5-dichloroaniline; alternatively, but less desirably, 3,5-dichlorophenylisothiocyanate may be reacted with 3,4,5-trichloroaniline. The reactants may be heated together in the absence of a solvent. Preferably however, they are dissolved in an inert solvent, such as toluene, and the reaction is catalysed by the addition of a base, preferably a tertiary amine such as triethylamine.

The compounds of general Formula I have been found to possess extremely high anthelmintic activity in respect of tapeworms, and to combine this activity with low host toxicity and appreciable anthelmintic activity towards nematodes. The extremely high tapeworm activity shown by the compounds of general Formula I is unexpected in view of the much lower activity or substantial lack of activity exhibited by closely related compounds. The fact that this tapeworm activity is combined with activity against nematodes is advantageous. Accordingly the compounds of general Formula I are of value in the treatment of infestations of tapeworms such as Hymenolepis spp., Anoplocephala spp., Taenia spp., Dibothriocephalus spp., Echinococcus spp., Moniezia spp., Dipylidium spp., Raillietina spp., and Davainea spp., and of nematodes such as Ascaris spp., *Haemonchus contortus*, Trichostronglyus spp., Enterobius spp. etc.

In United States patent specification No. 2,983,646 there are disclosed anthelmintic compositions which comprise as active ingredient compounds of the general Formula II

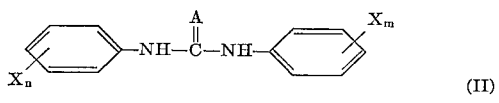

wherein A is oxygen or sulphur, X is bromine or chlorine, $m$ is an integer from 0–3, and $n$ is an integer from 0–3, provided that the sum of $m$ plus $n$ is at least 1. This general formula is of extremely wide scope and includes within it the compounds of general Formula I with which the present invention is concerned. However, the compounds of general Formula I and their use as anthelmintics are not specifically described in the aforesaid U.S. patent specification; it is not suggested therein that these particular compounds would possess properties superior to those of the compounds specifically listed in the specification.

The value of the compounds of general Formula I in the treatment of hosts infected with helminthiasis has been demonstrated in a number of tests, using in the first instance standard experimental animals normally used in the pre-clinical evaluation of anthelmintics. Two species of Oxyurid worms, viz. *Aspiculuris tetraptera* and *syphacea obvelata*, parasitise the caecum and large intestine of white mice. Both species are phylogenetically closely related to the pinworm *Enterobius vermicularis*. In addition tapeworms, Hymenolepis spp., parasitise the small intestine of white mice, and these are closely related to the common tapeworm (*Hymenolepis nana*). A test was carried out as follows:

Mice infected with Oxyurid and Hymenlepis spp. were split up into dose groups, and each was given a single dose by oral intubation of the compound under test in the form of an aqueous dispersion. The size of the dose was dependent on the toxicity of the compound, which was previously determined approximately. If the $LD_{50}$ (dose proving lethal to 50% of the mice to which it is administered) of a compound was greater than 1000 mg./kg., then a dose of 1000 mg./kg. was used in this initial test. If the $LD_{50}$ was 1000 mg./kg. or less, the dose given was three-quarters of the $LD_{50}$. The mice were fed in the normal way for the next 24 hours, and they were then fasted overnight and killed, and post-mortems carried out. The caecum together with about two inches of the large intestine were removed and transferred to a Petri dish containing 40 mls. of water. The intestine and caecum were opened up and the gut contents and mucosa were scraped off into the water. The resulting suspension was then examined over a dark background with the naked eye for oxyurids. The posterior six inches of the small intestine were removed and pressed between two sheets of glass and examined under the microscope for the presence of tapeworms. An undosed control group of mice was included in each test. On the basis of the above examination, carried out in the light of the examination of the undosed controls, each mouse was recorded as either infected with or clear of worms. The activity of a compound was reported as the percentage $$\frac{C}{D} \times 100$$

where C is the number cleared mice and D is the number of mice in the dose group.

Compounds showing appreciable activity were then tested at lower dose rates.

Results obtained in this test with the compounds of general Formula I are shown in Table I.

TABLE I

| Compound | Dose, mg./kg. | Percentage of animals clear of infection at post mortem | |
|---|---|---|---|
| | | Oxyuris spp. | Tapeworms |
| N,N'-bis(3,4,5-trichlorophenyl) thiourea | 1,000<br>500<br>250<br>125<br>50<br>25<br>12.5<br>6.25 | 100<br>100<br>70<br>60<br>0<br>----<br>----<br>---- | 100<br>100<br>100<br>100<br>100<br>100<br>50<br>50<br>20 |
| N-3,5-dichlorophenyl-N'-3,4,5-trichlorophenyl thiourea | 1,000<br>500<br>250<br>125<br>50<br>25<br>12.5<br>6.25 | 100<br>90<br>----<br>30<br>----<br>----<br>----<br>---- | 100<br>100<br>90<br>100<br>50<br>40<br>20 |
| N-3,4-dichlorophenyl-N'-3,4,5-trichlorophenyl thiourea | 1,000<br>800<br>200<br>50 | 100<br>100<br>80<br>40 | 100<br>100<br>100<br>60 |

Results obtained in the above test with compounds closely related to those of general Formula I and falling within the formula of U.S. patent specification No. 2,983,646 (general Formula II hereinbefore described) are shown in Table II. (Those compounds marked with an asterisk are specifically listed in U.S. specification.)

TABLE II $$X_n\text{—}\underset{}{\bigcirc}\text{—NH—}\overset{A}{\underset{\|}{C}}\text{—NH—}\underset{}{\bigcirc}\text{—}X_m$$

| $X_n$ | $X_m$ | A | Dose, mg./kg. | Percentage of animals clear of infection at post mortem | |
|---|---|---|---|---|---|
| | | | | Oxyuris spp. | Tapeworms |
| H | 2-Cl | O | 1,000 | 0 | 20 |
| H* | 3-Cl | O | 1,000 | 0 | 20 |
| H* | 4-Cl | O | 1,000 | 0 | 0 |
| H | 4-Br | O | 750 | 0 | 0 |
| H | 2,3-Cl₂ | O | 1,000 | 0 | 0 |
| H | 2,4-Cl₂ | O | 1,000 | 0 | 0 |
| H | 2,5-Cl₂ | O | 1,000 | 0 | 0 |
| H | 3,4-Cl₂ | O | 750 | 0 | 20 |
| H | 3,5-Cl₂ | O | 1,000 | 0 | 20 |
| H | 2,3,5-Cl₃ | O | 500 | 0 | 40 |
| H | 2,3,6-Cl₃ | O | 1,000 | 0 | 20 |
| H | 2,4,5-Cl₃ | O | 1,000 | 0 | 0 |
| H | 2,4,6-Br₃ | O | 1,000 | 0 | 0 |
| H | 2,4,6-Cl₃ | O | 1,000 | 0 | 0 |
| H | 3,4,5-Cl₃ | O | 1,000 | 0 | 0 |
| 2-Cl* | 4-Cl | O | 1,000 | 20 | 20 |
| 2-Br | 4-Br | O | 1,000 | 0 | 0 |
| 3-Cl | 3-Cl | O | 1,000 | 0 | 20 |
| 3-Cl* | 4-Cl | O | 1,000 | 20 | 20 |
| 4-Cl* | 4-Br | O | 1,000 | 0 | 0 |
| 2-Cl | 3,4-Cl₂ | O | 1,000 | 0 | 20 |
| 3-Cl | 2,5-Cl₂ | O | 1,000 | 0 | 0 |
| 3-Cl* | 3,4-Cl₂ | O | 1,000 | 0 | 80 |
| 3-Cl* | 3,4-Cl₂ | O | 500 | | 60 |
| 4-Cl* | 3,4-Cl₂ | O | 500 | 0 | 70 |
| 4-Cl* | 3,4-Cl₂ | O | 125 | 0 | 50 |
| 2-Cl | 3,4,5-Cl₃ | O | 1,000 | 0 | 20 |
| 3-Cl | 2,4,5-Cl₃ | O | 1,000 | 20 | 0 |
| 3-Cl | 3,4,5-Cl₃ | O | 1,000 | 0 | 0 |
| 4-Cl | 3,4,5-Br₃ | O | 1,000 | 40 | 20 |
| 4-Br | 3,4,5-Cl₃ | O | 1,000 | 0 | 0 |
| 4-Br | 3,4,5-Br₃ | O | 500 | 0 | 40 |
| 2,4-Cl₂ | 2,4-Cl₂ | O | 1,000 | 0 | 0 |
| 2,5-Cl₂ | 2,5-Cl₂ | O | 1,000 | 0 | 80 |
| 3,4-Cl₂ | 3,4-Cl₂ | O | 500 | | 20 |
| 3,4-Cl₂ | 3,4-Cl₂ | O | 500 | 0 | 20 |
| 3,5-Cl₂ | 3,5-Cl₂ | O | 1,000 | 0 | 20 |
| 2,3-Cl₂ | 3,4-Cl₂ | O | 1,000 | 0 | 40 |
| 2,4-Cl₂ | 3,4-Cl₂ | O | 750 | 20 | 0 |
| 2,5-Cl₂ | 3,4-Cl₂ | O | 1,000 | 0 | 20 |
| 2,5-Cl₂ | 3,4,5-Cl₃ | O | 500 | 20 | 20 |
| 3,4-Cl₂ | 2,4,5-Cl₃ | O | 1,000 | 0 | 20 |
| 3,4-Cl₂ | 2,4,6-Br₃ | O | 1,000 | 0 | 60 |
| 3,4-Cl₂ | 3,4,5-Br₃ | O | 1,000 | 0 | 0 |
| 2,4,6-Br₃ | 2,4,6-Br₃ | O | 1,000 | 0 | 20 |
| 2,4,6-Br₃ | 3,4,5-Cl₃ | O | 1,000 | 0 | 20 |
| 2,4,5-Cl₃ | 2,4,5-Cl₃ | O | 500 | 0 | 20 |
| 2,4,6-Cl₃ | 2,4,6-Cl₃ | O | 500 | 0 | 60 |
| 3,4,5-Cl₃ | 3,4,5-Cl₃ | O | 1,000 | 0 | 100 |
| H | 3,4,5-Cl₃ | S | 750 | 20 | 40 |
| H | 3,4,5-Cl₃ | S | 100 | 0 | 0 |
| 3-Cl | 3-Cl | S | 1,000 | 0 | 20 |
| 2-Cl | 2-Cl | S | 1,000 | 0 | 60 |
| 4-Cl | 3,4-Cl₂ | S | 1,000 | | 40 |
| 4-Cl | 3,4-Cl₂ | S | 500 | | 100 |
| 3-Cl | 3,4,5-Cl₃ | S | 1,000 | 0 | 0 |
| 3-Cl | 3,4,5-Cl₃ | S | 50 | 0 | 100 |
| 4-Cl | 3,4,5-Cl₃ | S | 1,000 | 20 | 40 |
| 4-Cl | 3,4,5-Cl₃ | S | 100 | 0 | 60 |
| 2,5-Cl₂ | 2,5-Cl₂ | S | 1,000 | 20 | 0 |
| 2,4-Cl₂ | 2,4-Cl₂ | S | 1,000 | 0 | 20 |
| 2,3-Cl₂ | 2,3-Cl₂ | S | 1,000 | 0 | 100 |
| 3,4-Cl₂* | 3,4-Cl₂ | S | 250 | 0 | 60 |
| 3,4-Cl₂* | 3,4-Cl₂ | S | 500 | 0 | 60 |
| 3,4-Br₂ | 3,4-Br₂ | S | 1,000 | 0 | 100 |
| 3,5-Cl₂ | 3,5-Cl₂ | S | 100 | 0 | 20 |
| 3,5-Cl₂ | 3,5-Cl₂ | S | 500 | 0 | 40 |
| 3,5-Br₂ | 3,5-Br₂ | S | 1,000 | 0 | 80 |
| 2,4-Cl₂ | 3,4,5-Cl₃ | S | 250 | 0 | 40 |
| 2,4-Cl₂ | 3,4,5-Cl₃ | S | 1,000 | 40 | 100 |
| 3,4-Br₂* | 3,4,5-Br₃ | S | 50 | 0 | 0 |
| 3,4-Br₂* | 3,4,5-Br₃ | S | 1,000 | 0 | 80 |
| 2,3,4-Cl₃ | 2,3,4-Cl₃ | S | 500 | | 20 |
| 2,4,6-Cl₃ | 3,4,5-Cl₃ | S | 1,000 | 60 | 100 |
| 2,4,6-Cl₃ | 3,4,5-Cl₃ | S | 50 | 0 | 0 |
| 3,4,5-Br₃ | 3,4,5-Br₃ | S | 750 | 0 | 20 |

A comparison of the results shown in Table I with those in Table II indicates clearly the marked superiority of the compounds of general Formula I over the representative selection of closely related compounds examined.

The anthelmintic value of the compounds of general Formula I has been investigated further, for example in the case of sheep, pigs and dogs in trials of which the following are typical:

*Sheep.*—A lamb naturally infested with *Moniezia expansa* was brought indoors and drenched with 50 mg./kg. of N,N'-bis(3,4,5-trichlorophenyl) thiourea in 10% gum acacia solution. The droppings were collected and examined for tapeworms and nematodes passed out. Detached Moniezia segments, both gravid and immature, were passed on the first and second day after dosing but they were in such degenerate condition that no estimate of the number of worms they represented could be made. The Moniezia egg count dropped to nil. Also about 145 Nematodirus and 125 other small nematodes were estimated to have been passed out from the first to third day after dosing.

*Pigs.*—Two growing pigs of approximately 30 kg. weight were dosed with 100 mg./kg. of N,N'bis(3,4,5-trichlorophenyl) thiourea mixed in the wet food. During the three days following dosing, 794 *Oesophagostomum dentatum* were estimated to have been passed out and the eg count for strongyles fall to practically nothing. On the fourth day after dosing the dropping were negative for adult nematodes.

*Dogs.*—A number of dogs were dosed with 30 mg./kg. or 50 mg./kg. of N,N'bis(3,4,5-trichlorophenyl) thiourea in gelatin capsules. Infestation by *Taenia hydatigena* had been confirmed in each case prior to dosing by recovery of gravid segments from the droppings. Most of the dogs vomited within a few hours, but no griping or depression was seen and body weights were all well maintained. A few days after dosing, all the dogs were clear of tapeworm infestations as confirmed by administering to them 1.5 mg./kg. of arecoline hydrobromide in the food. No worms were passed as a result of this treatment.

The following non-limitative examples illustrate the invention.

Example 1

(a) Dry gelatin capsules were prepared, each containing 0.25 gm. of N,N'-bis(3,4,5-trichlorophenyl) thiourea, N - 3,4 - dichlorophenyl - N' - 3,4,5 - trichlorophenyl thiourea or N - 3,5 - dichlorophenyl - N' - 3,4,5 - trichlorophenyl thiourea.

(b) Dry gelatin capsules were prepared as in (a) and were given an enteric coating by contacting them for three mins. with a mixture of formaldehyde (2 parts), alcohol (2 parts) and water.

Example 2

A dispersible powder was prepared by milling the following ingredients (parts by weight):

| | Parts |
|---|---|
| N,N'-bis(3,4,5-trichlorophenyl)thiourea | 25 |
| Light magnesium carbonate | 48.75 |
| Colloidal silicic acid | 25 |
| Gum T.T. (carob gum) | 1 |
| Cetrimide | 0.25 |

Similar dispersible powders are prepared using N-3,5-dichlorophenyl- and N - 3,4 - dichlorophenyl-N'-3,4,5-trichlorophenyl thiourea in place of N,N'-bis(3,4,5-trichlorophenyl) thiourea.

Example 3

A dispersible powder was prepared by milling the following ingredients (parts by weight):

| | Parts |
|---|---|
| N,N'-bis(3,4,5-trichlorophenyl)thiourea | 25 |
| Aerosil 2491 (a proprietary silicic acid) | 20 |
| Belloid T.D. (a proprietary dispersing agent) | 7.5 |
| Perminal B.X. (a proprietary wetting agent) | 7.5 |
| Sterculia (suspending agent) | 5 |
| Kaolin | 35 |

Similar dispersible powders were prepared using N-3,5-dichlorophenyl- and N-3,4-dichlorophenyl-N'-trichlorophenyl-thiourea in place of N,N'-bis(3,4,5-trichlorophenyl)thiourea.

Example 4

A dispersible powder was prepared by milling the following ingredients (parts by weight):

| | Parts |
|---|---|
| N,N'-bis(3,4,5-trichlorophenyl)thiourea | 25 |
| Thiabendazole | 25 |
| Light magnesium carbonate | 23.75 |
| Colloidal silicic acid | 25 |
| Gum T.T. (carob gum) | 1.0 |
| Cetrimide | 0.25 |

Similar dispersible powders were prepared using N-3,5-dichlorophenyl- and N-3,4-dichlorophenyl-N'-3,4,5-trichlorophenyl-thiourea in place of N,N'-bis(3,4,5-trichlorophenyl)thiourea.

Example 5

3,4,5-trichlorophenyl isothiocyanate (1 gm.) was mixed with 3,5-dichloroaniline (618 mg.) and the mixture heated for 22 hours at 100° C. The residue was recrystallised from toluene to give N-3,5-dichlorophenyl-N'-3,4,5-trichlorophenyl thiourea, M.P. 160–161° C. (Found: Cl, 43.7. $C_{13}H_7Cl_5N_2S$ requires Cl 44.3%.)

Example 6

3,4,5-trichlorophenyl isothiocyanate (68 gm.) and 3,5-dichloroaniline (46.2 gm.) were dissolved in toluene (350 ml.). The solution was filtered and triethylamine (2.5 ml.) added to the filtrate; the mixture was allowed to stand for 24 hours. The solid material was isolated by filtration and washed with toluene (50 ml.) to give N-3,5-dichlorophenyl-N'-3,4,5-trichlorophenyl thiourea, M.P. 160–161° C.

We claim:

1. A method of treating helminthiasis which comprises orally administering to a host infected with helminthiasis an anthelmintically effective amount of a compound of the formula

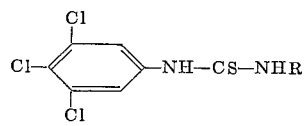

in which R is selected from the group consisting of 3,4,5 trichlorophenyl, 3,4-dichlorophenyl and 3,5-dichlorophenyl.

2. A method according to claim 1, in which said compound is administered at a dosage of about 15 to 100 milligrams per kilogram of host weight.

3. A method of treating helminthiasis in sheep which comprises orally administering to sheep infected with helminthiasis N,N'-bis(3,4,5-trichlorophenyl)thiourea at a dosage of 50 to 100 milligrams per kilogram of sheep body weight.

4. An anthelmintic composition in dosage unit form comprising an anthelmintically effective amount of a compound of the formula

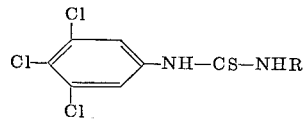

wherein R is selected from the group consisting of 3,4,5-trichlorophenyl, 3,4-dichlorophenyl and 3,5-dichlorophenyl in association with a non-toxic diluent.

5. A composition in dosage unit form as claimed in claim 4 in which said non-toxic diluent is selected from the group consisting of dispersing agents, suspending agents and wetting agents and the composition is in the form of a wettable powder.

6. An anthelmintic dosage unit in tablet form, said tablet comprising an anthelmintically effective amount of a compound of the formula

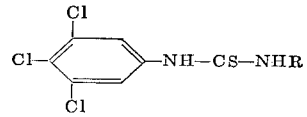

wherein R is selected from the group consisting of 3,4,5-trichlorophenyl, 3,4-dichlorophenyl and 3,5-dichlorophenyl and a solid excipient.

7. An anthelmintic dosage unit in enteric coated tablet form, said tablet comprising an anthelmintically effective amount of a compound of the formula

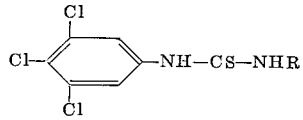

wherein R is selected from the group consisting of 3,4,5-trichlorophenyl, 3,4-dichlorophenyl and 3,5-dichlorophenyl and a solid excipient and being surrounded by an enteric coating.

8. An anthelmintic dosage unit in capsule form, said capsule comprising an anthelmintically effective amount of a compound of the formula

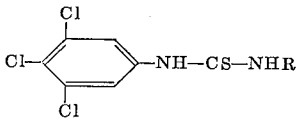

wherein R is selected from the group consisting of 3,4,5-trichlorophenyl, 3,4-dichlorophenyl and 3,5-dichlorophenyl surrounded by an encapsulating medium.

9. An anthelmintic dosage unit in enteric coated capsule form, said capsule comprising an anthelmintically effective amount of a compound of the formula

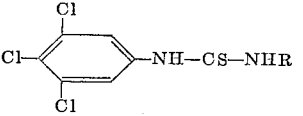

wherein R is selected from the group consisting of 3,4,5-trichlorophenyl, 3,4-dichlorophenyl and 3,5-dichlorophenyl surrounded by an enteric encapsulating medium.

10. An anthelmintic feed composition in dosage unit form comprising an anthelmintically effective amount of a compound of the formula

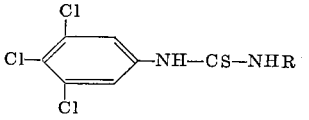

wherein R is selected from the group consisting of 3,4,5-trichlorophenyl, 3,4-dichlorophenyl and 3,5-dichlorophenyl dispersed in a feed stuff.

11. N-3,5-dichlorophenyl - N' - 3,4,5 - trichlorophenyl thiourea.

References Cited by the Examiner

UNITED STATES PATENTS 2,983,646  5/1961  Ruhoff _____ 167—53

JULIAN S. LEVITT, *Primary Examiner.*

FRANK CACCIAPAGLIA, JR., *Examiner.*

SAM ROSEN, *Assistant Examiner.*